United States Patent
Johnson

(10) Patent No.: US 10,843,507 B2
(45) Date of Patent: *Nov. 24, 2020

(54) TWO PIECE RIM AND TIRE CONNECTED ASSEMBLY

(71) Applicant: Hoosier Stamping & Manufacturing Corp., Evansville, IN (US)

(72) Inventor: Thomas J. Johnson, Evansville, IN (US)

(73) Assignee: Hoosier Stamping & Manufacturing Corp., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,209

(22) Filed: Mar. 3, 2020

(65) Prior Publication Data

US 2020/0262238 A1    Aug. 20, 2020

Related U.S. Application Data

(63) Continuation of application No. 15/648,517, filed on Jul. 13, 2017, now Pat. No. 10,618,349.

(51) Int. Cl.
*B60B 25/00* (2006.01)
*B60C 7/26* (2006.01)
(Continued)

(52) U.S. Cl.
CPC .............. *B60B 25/006* (2013.01); *B60B 3/08* (2013.01); *B60C 7/26* (2013.01); *B60B 3/10* (2013.01);
(Continued)

(58) Field of Classification Search
CPC ... B60B 25/006; B60B 3/00; B60B 2900/541; B60B 27/02; B60B 2900/551;
(Continued)

(56) References Cited

U.S. PATENT DOCUMENTS 1,396,778 A  * 11/1921  Parham ..................... B60C 7/24
                                                    152/385
2,848,278 A    8/1958   Todd
(Continued)

FOREIGN PATENT DOCUMENTS

EP    1 238 824 A1    9/2002
EP    2 298 575 A1    3/2011
(Continued)

OTHER PUBLICATIONS

Agricultural Tires for All Applications—ACE Products, Inc., Water Street, Conneautville, PA 16406 Phone (814) 587-2025—Fax (814-587-3946.

*Primary Examiner* — S. Joseph Morano
*Assistant Examiner* — Jean W Charleston
(74) *Attorney, Agent, or Firm* — Woodard Emhardt Henry Reeves & Wagner LLP

(57) ABSTRACT

A two-piece rim and tire assembly. The tire is held to the rim by fasteners extending through flanges integral with the tire main body and then into the rim. Further, the outer edges of the rim clinchably mount the tire main body thereto. A flexible overhanging portion extends outwardly of the tire main body minimizing dirt and mud accumulation on the tire and rim. A bearing is held within the rim by a ring.

25 Claims, 6 Drawing Sheets

(51) Int. Cl.
  *B60B 3/08* (2006.01)
  *B60B 3/10* (2006.01)
  *B60B 27/02* (2006.01)
  *B60C 7/12* (2006.01)

(52) U.S. Cl.
  CPC .......... *B60B 27/02* (2013.01); *B60B 2900/523* (2013.01); *B60B 2900/541* (2013.01); *B60B 2900/551* (2013.01); *B60C 7/12* (2013.01); *B60C 2200/08* (2013.01); *B60Y 2200/22* (2013.01)

(58) Field of Classification Search
  CPC ....... B60B 3/10; B60B 2900/523; B60C 7/26; B60C 7/12; B60C 2200/08; B60Y 2200/22
  USPC ..................................................... 301/64.102
  See application file for complete search history.

(56) References Cited

U.S. PATENT DOCUMENTS

| | | | |
|---|---|---|---|
| 4,580,846 A | 4/1986 | Johnson et al. | |
| 5,251,965 A * | 10/1993 | Johnson | B60B 3/08 152/323 |
| 6,315,366 B1 * | 11/2001 | Post | B60B 25/00 152/405 |
| 6,572,198 B1 * | 6/2003 | Lai | A63C 17/22 301/5.301 |
| 6,896,336 B2 | 5/2005 | Hodges et al. | |
| 8,925,604 B2 | 1/2015 | Putz | |
| 2004/0135333 A1 | 7/2004 | Feick | |
| 2005/0173968 A1 * | 8/2005 | Rivers | B60B 7/20 301/37.25 |
| 2005/0264096 A1 | 12/2005 | Hodges et al. | |
| 2010/0107946 A1 | 5/2010 | Cooney et al. | |
| 2011/0095597 A1 * | 4/2011 | Knowles | B60C 7/24 301/64.303 |
| 2012/0285595 A1 * | 11/2012 | Su | B60C 7/26 152/310 |
| 2015/0223384 A1 | 8/2015 | Phely | |
| 2015/0223388 A1 | 8/2015 | Phely et al. | |
| 2016/0114623 A1 * | 4/2016 | Smith | B60C 7/24 301/11.1 |

FOREIGN PATENT DOCUMENTS

| | | |
|---|---|---|
| EP | 2 904 889 A1 | 8/2015 |
| EP | 2 904 890 A1 | 8/2015 |

* cited by examiner

TWO PIECE RIM AND TIRE CONNECTED ASSEMBLY

CROSS REFERENCE TO RELATED APPLICATION

This application is a continuation of U.S. patent application Ser. No. 15/648,517 filed Jul. 13, 2017, which is incorporated herein by reference.

BACKGROUND OF THE INVENTION

Field of the Invention

The present invention relates generally to the field of tires and wheel/tire assemblies.

Description of the Prior Art

A variety of wheel rim/tire assemblies are provided for use in different environments with different surfaces supporting the wheel rim/tire assembly. Separate problems exist in the case of such assemblies for supporting a tractor, trailer or other type of vehicle driven across rough ground, such as found in an agricultural environment. In many cases, the rim and tire have a relatively large diameter allowing for possible relative movement between the rim and tire as the wheel encounters variations in the terrain including ridges and rocks. It is the custom to provide a rim having outer circumferentially extending and mutually facing rim edges that clinch tightly on the opposite sides of the tire providing a unified assembly. Disclosed herein is a means of attaching the tire to the rim by means of tabs or flanges integrally connected to the tire and then fastened directly to the wheel rim thereby limiting relative motion between the tire and rim. Further, and in particular in an agricultural environment, the tire and rim may accumulate mud from the field as the wheel is driven across the field. The tire disclosed herein includes a circumferentially extending portion that extends outwardly from the main body of the tire and rim with the portion being flexible thereby shaking off the mud as the wheel is rotated. An additional problem occurs when removing the bearing provided in the wheel hub mounted to the vehicle axle. As the result, the tire in many cases must be removed from the rim with the rim then being disassembled to allow for the removal of the bearing. The assembly disclosed herein has a bearing that may be removed from the wheel without requiring either the removal of the tire from the rim or the disassembly of the rim.

SUMMARY OF THE INVENTION

On embodiment of the present invention is a wheel assembly that is mountable to a vehicle. A first wheel disc has a first circular rim with a first outer portion and a first hub with a first central opening. A second wheel disc has a second circular rim with a second outer portion and a second hub and a second central opening. First fasteners extend from the first hub to the second hub securing the first wheel disc to the second wheel disc and forming a wheel rim so the first central opening is aligned with the second central opening with a central rotational axis. A tire with a main body is attached to the wheel rim and clinched between the first outer portion and the second outer portion of the first wheel disc and the second wheel disc facing each other. Second fasteners attach the tire to the wheel rim.

Another embodiment of the present invention is a wheel rim for mounting a tire to a vehicle. A first wheel disc has a first circular rim and a first hub with a first central opening. A second wheel disc has a second circular rim and a second hub and a second central opening. Fastening means are connected to the first hub and to the second hub securing the first wheel disc to the second wheel disc together forming a wheel rim so the first central opening is aligned with the second central opening defining a central rotational axis of the wheel rim. Fasteners extend through the tire and the wheel rim to secure the tire to the wheel rim; and wherein the first wheel disc is secured to the second wheel disc and defines a tire receiving clinching space therebetween.

Yet a further embodiment of the present invention is a tire for mounting to a wheel rim in turn mountable to an axle of a vehicle. The tire main body surrounds the wheel rim with the main body including an inwardly facing surface and an outwardly facing surface with a first exterior side surface and a second exterior side surface extending between the inwardly facing surface the outwardly facing surface. The main body includes a plurality of flanges projecting inwardly with the flanges fixedly connectable to the wheel rim limiting relative motion between the tire and the wheel rim.

It is an object of the present invention to provide a tire that will minimize the accumulation of dirt and mud thereon.

A further object of the present invention is to provide a wheel rim and tire assembly that provides a fixed connection between the tire and rim minimizing relative motion therebetween to prevent the tire from rolling off the wheel rim while allowing the tire to be flexible relative to the wheel rim shaking off any dirt thereon.

A further object of the present invention is to provide a wheel rim/tire combination having a centrally located bearing that is easily removable.

A further object of the present invention is to provide a tire having tabs attaching the tire to the rim with the tire having a flexible outer portion cooperatively allowing and creating flexibility in the tire that will shake mud and dirt from the wheel.

Related object and advantages of the present invention will be apparent from the following description.

DESCRIPTION OF THE PREFERRED EMBODIMENTS

Figure 1:
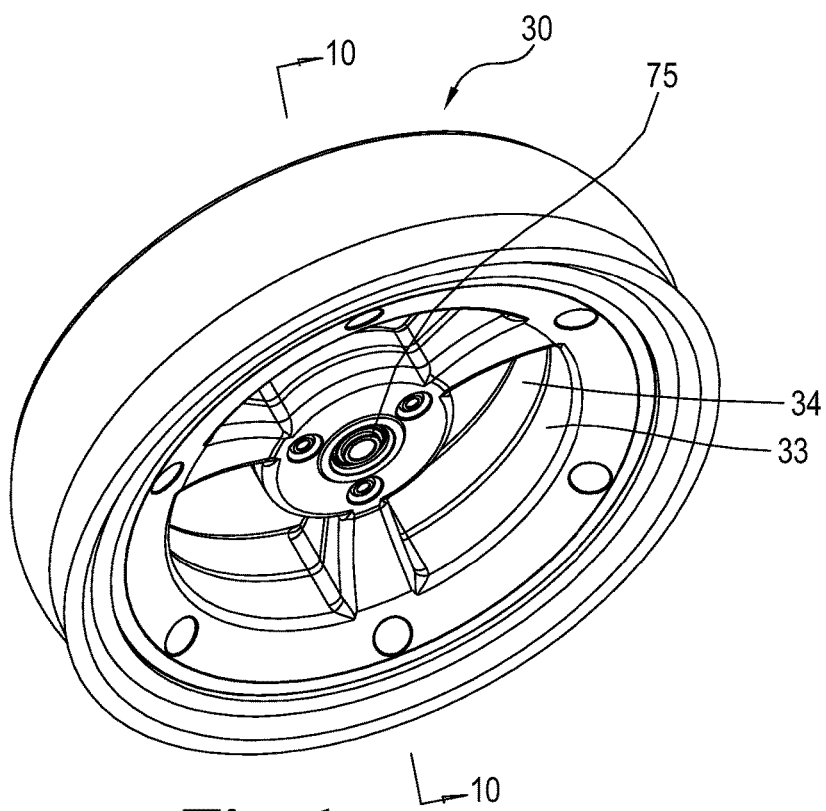
FIG. 1 is a front perspective view of a tire and wheel rim assembly incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
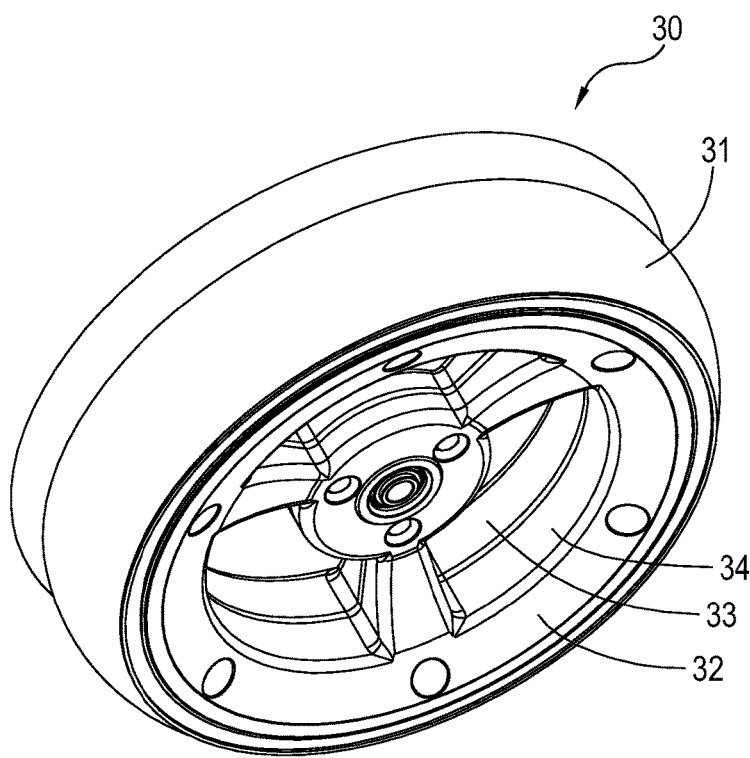
FIG. 2 is a rear perspective view of the assembly of FIG. 1.
Figure 4:
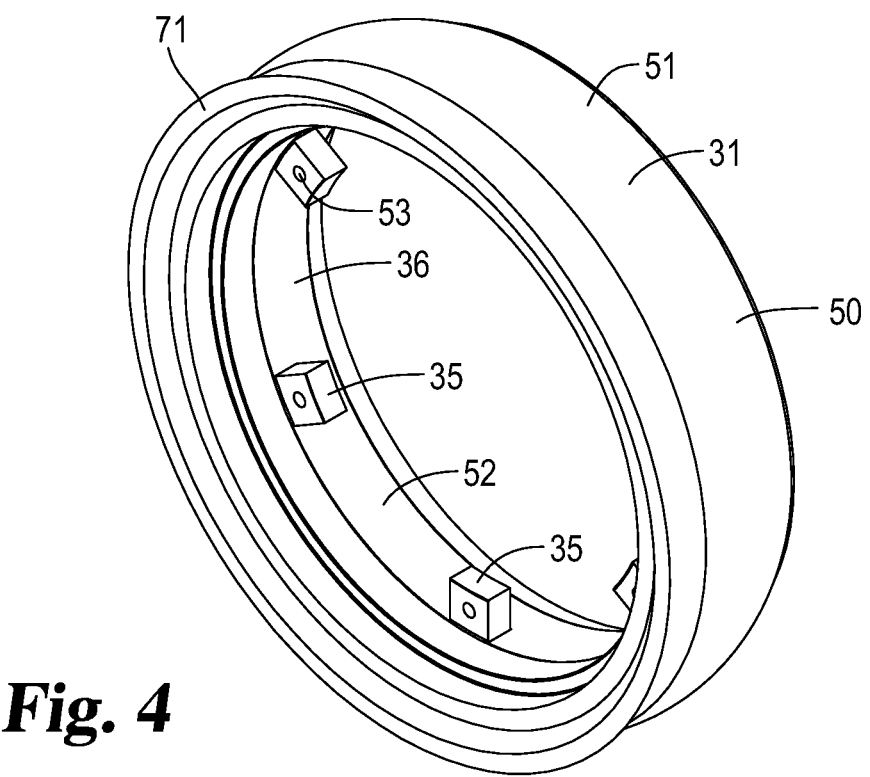
FIG. 4 is a perspective view of the tire removed from the wheel rim of FIG. 3.
Figure 5:
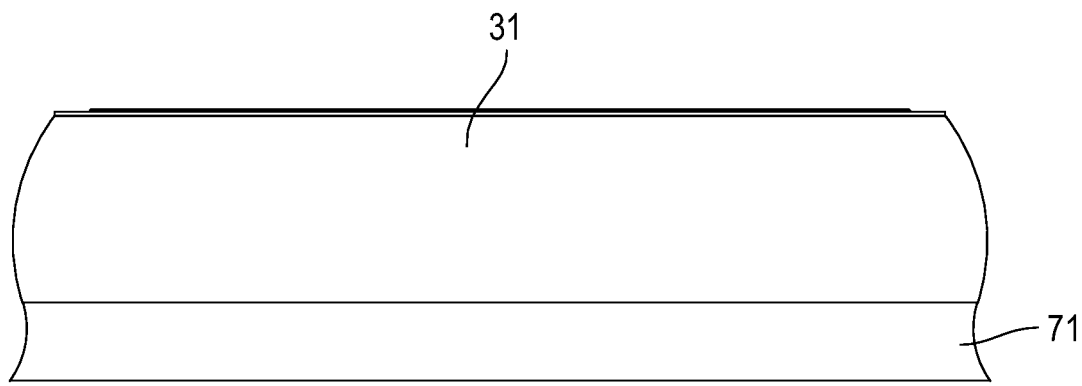
FIG. 5 is an end view of the tire of FIG. 4.
Figure 6:
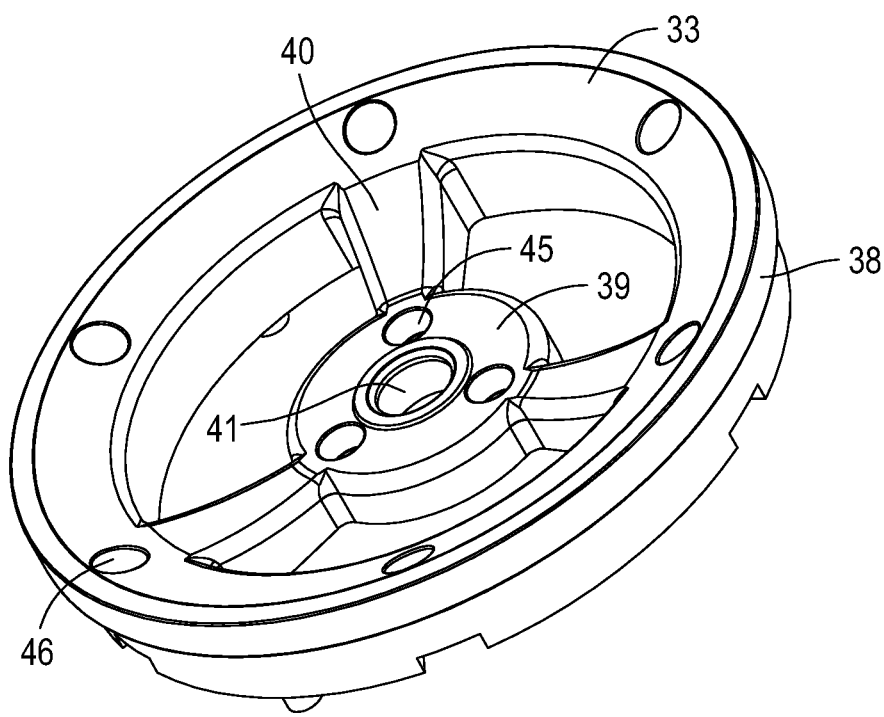
FIG. 6 is a perspective view of the outward side of the wheel disc included in the composite rim of FIG. 3.
Figure 7:
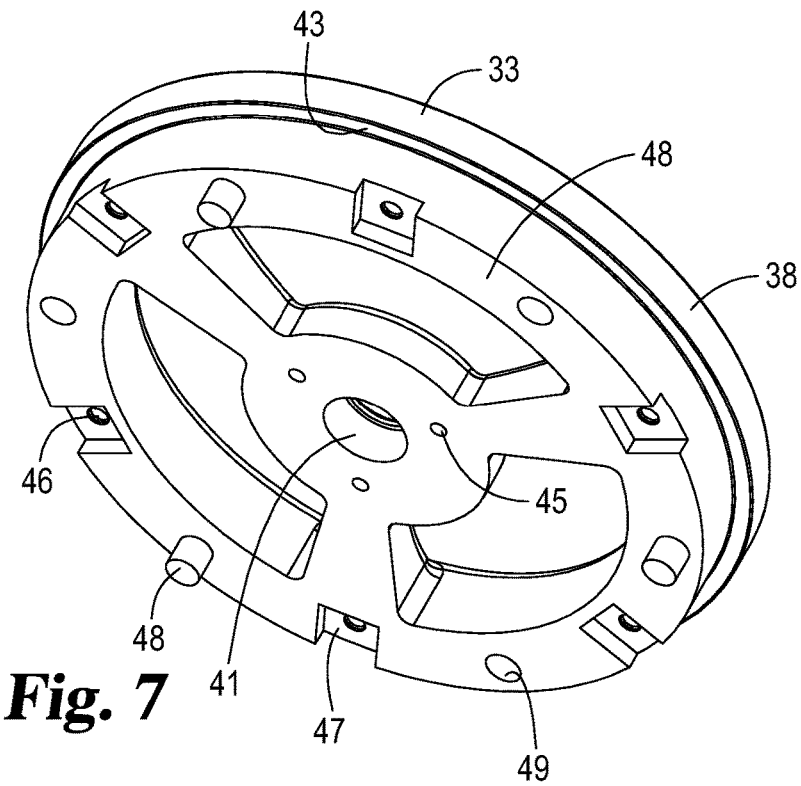
FIG. 7 is perspective view of the inwardly facing and opposite side of the wheel disc of FIG. 6.
Figure 8:
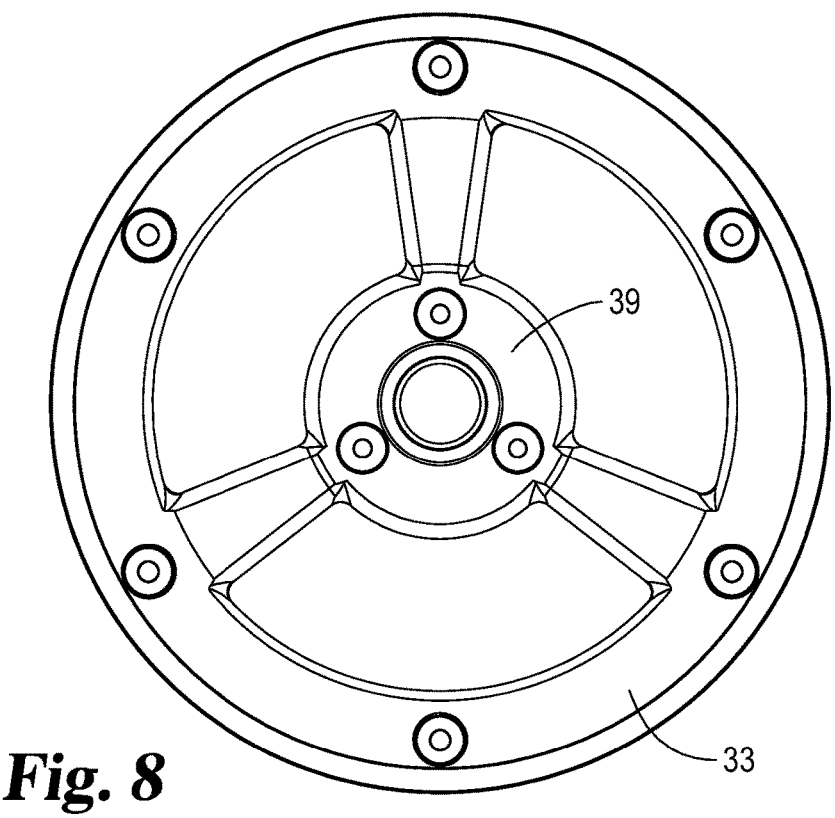
FIG. 8 is a plan view of the outwardly facing side of the disc of FIG. 6.
Figure 9:
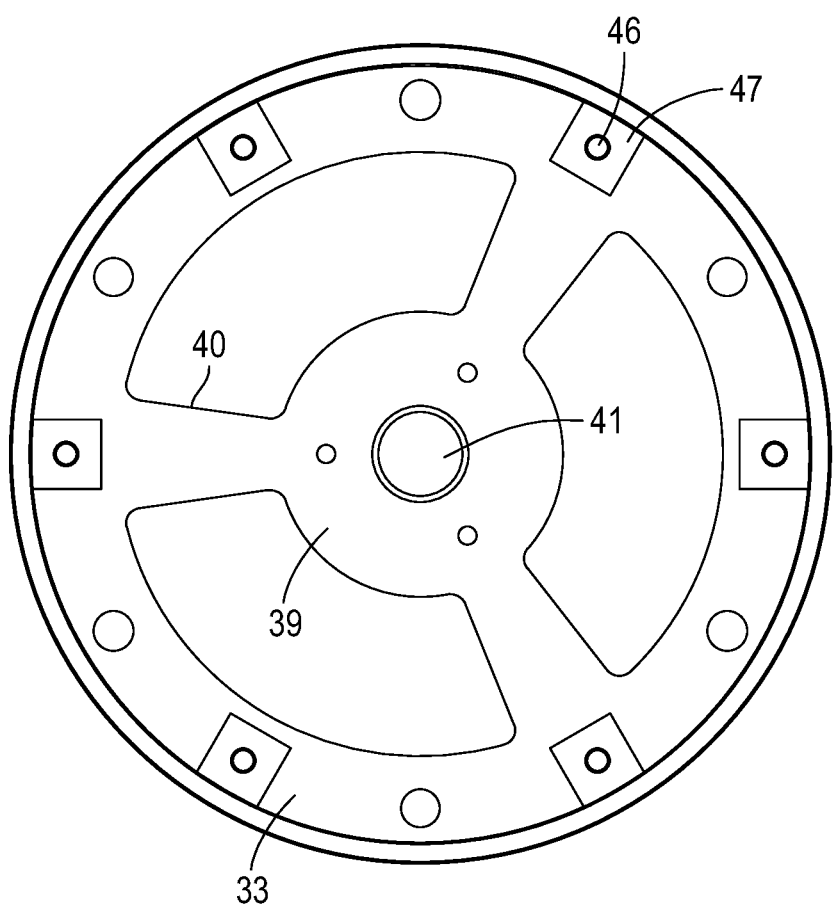
FIG. 9 is a plan view of the inwardly facing side of the wheel disc of FIG. 8.

Referring in particular to the drawings, the preferred embodiment of wheel 30 is shown in FIGS. 1 and 2. A front view of the assembly which is the side of the assembly facing outward is shown in FIG. 1 whereas the inwardly facing side facing the vehicle upon which the assembly is mounted is shown in FIG. 2. Many variations of tires are available and can be used in the instant combination. For example, the tire may or may not be inflated and typically will be hard or soft depending upon whether the user, such as a farmer has soft or hard ground. The tire 31 (FIG. 4) includes a plurality of tabs or flanges 35 integrally attached to the main body 36 of the tire. Flanges 35 extends radially inward and are attached to the wheel rim 32 (FIG. 2).

Referring now more particularly to FIGS. 6-9, a first wheel disc 33 will now be described it being understood that an identical description applies to the second wheel disc 34 with the exception that disc 34 includes a recess for receiving a snap ring adjacent the wheel bearing whereas disc 33 has a shoulder to receive the bearing as will be described later in the specification. Disc 33 has a first circular continuous rim 38 joined to a central hub 39 by radially extending spokes 40. The opposite ends of the spokes are integrally joined to circular rim 38 and hub 39. Hole 41 extends centrally through hub 39 and defines the axis 42 (FIG. 10) of rotation of the wheel. The continuous outer portions 38 of each wheel disc 33 and 34 are indented forming shoulders 43 (FIGS. 7 and 10) to receive a reduced portion 44 of the main body of tire 31.

Fastener holes extend through hub 39 and the outer portion 38 of wheel disc 33 to receive fasteners securing wheel disc 33 and 34 together as well as securing the radially inwardly extending flanges 35 to the wheel rim. In the embodiment shown in the drawings, hub 39 includes three holes 45 extending therethrough to receive fasteners for securing the hub to the adjacent hub of wheel disc 34. In addition, the outer portion 38 of disc 33 includes six holes 46 to receive fasteners extending through disc 33 and then through the tire flanges with the fasteners then extending through the outer portion of disc 34.

A plurality of tire flange receiving areas or recesses 47 (FIG. 7) are formed on the inwardly facing side of the outer portion of disc 33 with each recess 47 being aligned with a corresponding fastener hole 46. In addition, pegs 48 are mounted to the inwardly facing side of disc 33 and project towards and into disc 34.

In the embodiment in the drawings, a total of three fastener holes 45 are shown in hub 39 and six fastener holes 46 are shown on the outer portion of the disc it being understood that the number of fastener holes can be varied and is included in the present invention. Further, three pegs 48 are shown mounted to the inwardly facing side of disc 33 to project into complimentary sized holes in the mutually facing side of disc 34 which includes three additional pegs that extend from disc 34 and into disc 33. Thus, a total of six pegs lock the first wheel disc 33 and the second wheel disc 34 together with recesses 47 being spaced between pegs 48 and peg holes 46. In an embodiment shown in FIG. 7, either a peg 48 or a peg hole 46 is provided between adjacent recesses 47 of disc 33 and disc 34.

Tire 31 (FIG. 4) is mountable to the wheel rim composed of wheel disc 33 and 34 secured together. Tire 31 includes a main body 50 with an outwardly facing tread surface 51 for directly engaging the ground or other surface upon which the tire moves. Further, main body 50 has an inwardly facing surface 52 in contact with the wheel rim. Tabs or flanges 35 are an integral part of main body 31 and project radially inward towards the rotational axis 42. Each flange 53 includes a hole 53 through which a fastener extends to connect the tire directly to the opposing wheel disc 33 and 34. A first exterior side surface 54 (FIG. 10) and a second exterior side surface 55 extend between the inwardly facing tire surface 52 and the outwardly facing tire surface 51. The tire may be hollow or solid depending upon the particular application. Flange 35 projects inwardly from surface 52.

Figure 3:
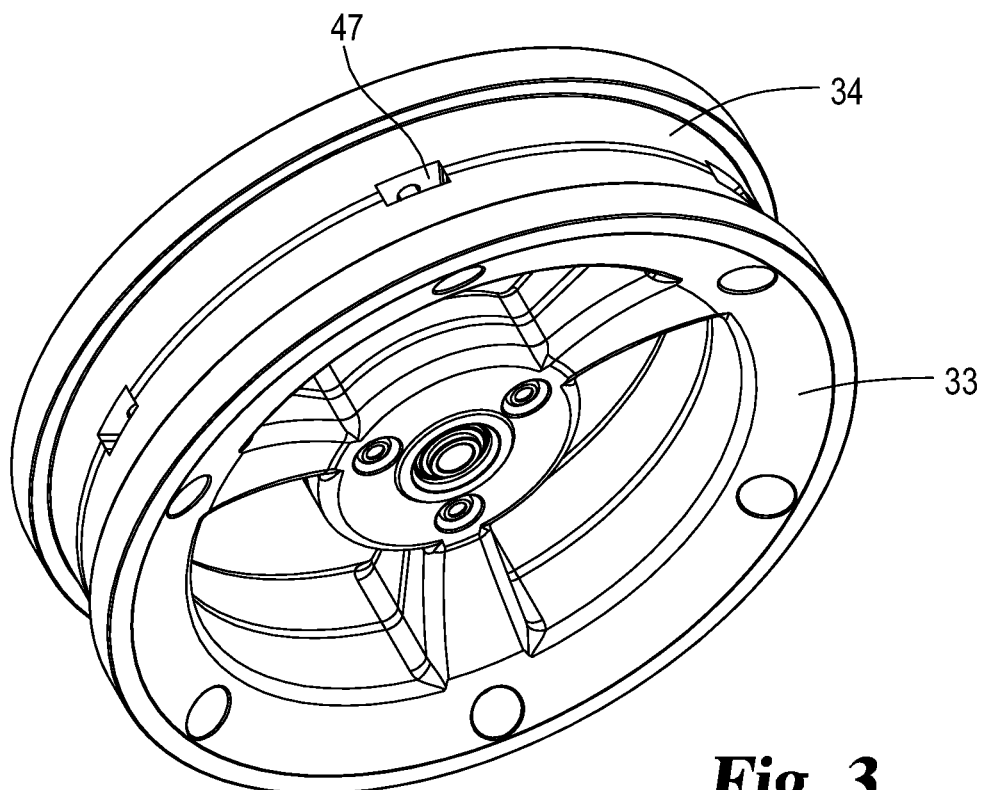
FIG. 3 is a perspective view of the composite rim of FIG. 1 with the tire removed therefrom.

The wheel rim is assembled by placing the interior surfaces 56 of disc 33 and 57 of disc 34 together so that the outer portion 38 of disc 33 and the outer portion 68 of disc 34 face outwardly thereby forming the wheel rim. The tire 31 is mounted to the wheel rim by extending the flanges 35 into the aligned recesses 47 (FIG. 7) of adjacent wheel discs 33 and 34. Thus, the recesses 47 of disc 33 must be aligned and positioned immediately across from the recesses 47 of wheel disc 34. Fasteners 60 (FIG. 10) are then extended into recesses 47. For example, the shank of fastener 60 (FIG. 10) is first extended through the hole 46 of wheel disc 34 with the shank then passing through flange 35 of the tire and then exiting the flange passing through the aligned hole 46 of disc 33 wherein a fastening nut 69 is threaded onto the shank of the bolt with the head of the bolt being located in recess 47 of disc 34. In this manner, all of the inwardly extending flanges 35 of the tire are extended into the mutually facing recesses 47 (FIG. 3) and then secured therein by the fasteners 60.

Figure 10:
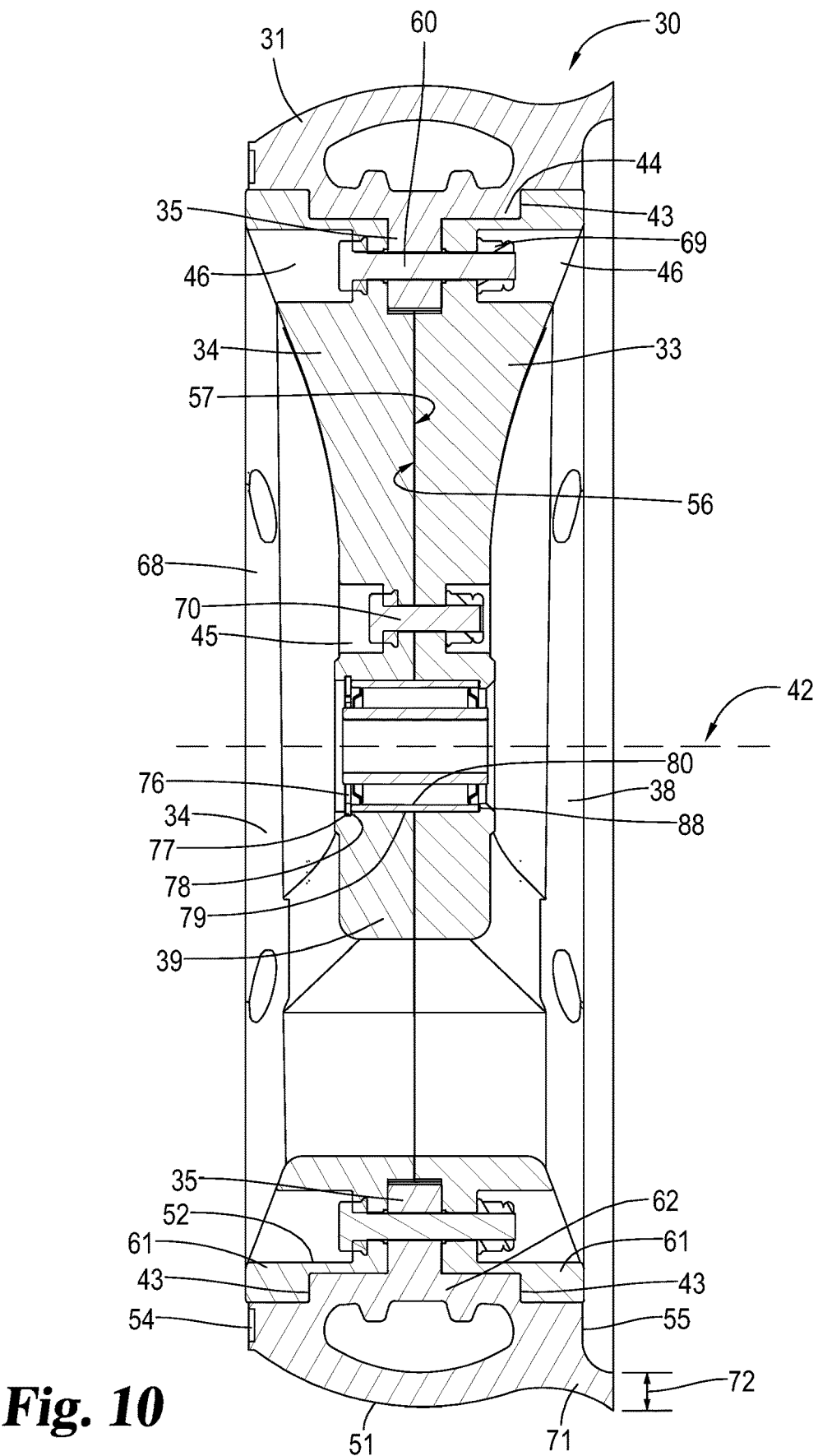
FIG. 10 is an enlarged cross-sectional view of the assembly of FIG. 1 taken along the line 10-10 and viewed in the direction of the arrows.

Agricultural tires are customarily mounted to their wheel rims by fitting the main body of the tire between the circumferentially extending mutually facing rims which are then tightened together to clinch the tire main body therebetween. Thus, as shown in FIG. 10, the circumferentially and outer extending edge portions 61 of the wheel discs are mutually opposed forming shoulders 43 in contact with the inwardly projecting portion 62 of the tire main body. As fasteners 60 are tightened, the mutually facing shoulders 43 of wheel discs 33 and 34 are moved towards each other thereby clinching and holding the inwardly projecting portion 62 of the tire therebetween. Securing flanges 35 directly to the wheel rim via fasteners 60 adds further stability to the wheel rim/tire assembly limiting relative motion between the wheel rim and the tire. Flange 35 is therefore sandwiched between the disc 33 and 34 once the flanges are inserted into the recesses 47 and secured thereto.

Fasteners 70 (FIG. 10) are extended through the mutually facing holes 45 of disc 33 and 34 securing the two discs together and forming the wheel rim. For example, the shank of fasteners 70 is extended into hole 45 of disc 34 and then into the aligned hole 45 of disc 33 being secured thereto by a conventional fastening nut with the head of the bolt being located within the recess provided in disc 34.

The main body 50 of tire 31 has an overhanging flexible portion 71 that extends outwardly of the remaining portion of the entire main body. Further, the overhanging portion can extend outwardly of the wheel rim. The overhanging portion 71 is integral with the tire main body and has a thickness 72 considerably less than the thickness of the remaining portion of the tire. Overhanging portion 71 extends continuously around the circumference of the tire and is sufficiently flexible so that when impacted by an external object, such as a rock or raised ground portion will bend inwardly and then outwardly thereby shaking off the dirt or mud accumulating on the tire. In this manner, the tire as well as the rim are kept relatively free of dirt and mud accumulating thereon. Overhanging portion 71 jets outwardly from the side wall 55 of the tire and can be positioned either on the tire portion facing away from the vehicle or the tire portion facing towards the vehicle. Likewise, overhanging portions can be provided so as to jet out from both surfaces 54 and 55. In addition, overhanging portion 71 may be manually moved by an operator contacting portion 71 by hand or with another object or with a particular object fastened to the vehicle.

The attachment of the tire to the rim by fasteners or bolts 60 (FIG. 10) extending through the flanges, also referred to as tabs 35, and into the rim prevent the tire from rolling off the rim as is the case in certain cases with the prior tire/rim combinations. Further, the attachment of the tabs to the rim via the fasteners allow for movement of the tire relative to the rim resulting in the dirt/mud to be shaken off the tire and rim. The attaching of the tire to the rim by fasteners not only allows for flexibility but also provides a secure manner of mounting the tire to the rim.

A conventional bearing 75 (FIG. 1) is located within the mutually facing holes 41 (FIG. 6) of wheel discs 33 and 34. The bearing facilitates the rotational motion of the wheel along axis 42 (FIG. 10) relative to the vehicle. A variety of methods are utilized to mount the wheel to a vehicle, such as by extending a fastening bolt through the central opening of the bearing to the vehicle axle. In order to replace the bearing in the prior devices, it is necessary to remove the tire from the rim. I have therefore devised a bearing that is held in place by means of a C-clamp or snap ring 76. Ring 76 (FIG. 10) is located at opening 41 of disc 34 and has an outer edge portion 77 that rides within a groove 78 formed on the interior surface 79 of hub 39 of disc 34. Groove 78 extends continuously around longitudinal axis 42 allowing the opposite ends of the ring to be moved together thereby decreasing the diameter of the ring with the ring then being slipped into groove 78 with the opposite ends of the C-shaped ring then being released thereby snapping the ring into the groove. The ring 76 abuts the end of the ring thereby limiting the movement of the bearing in one direction along the longitudinal axis 42. In order to exchange the bearing, the ring is removed from the hub, the bearing is replaced by a new bearing and the ring is then reinstalled into the groove 78.

Disc 33 is not provided with a groove 78. Instead, a shoulder 88 is provided in the hub 39 of disc 33 that is located against the end of the bearing limiting longitudinal movement of the bearing along axis 42.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the term 'vehicle' as used herein both in the specification and claims includes both a self-propelled vehicle as well as a vehicle that is not self-propelled that is pulled or pushed by another vehicle. Most seeders used in the agriculture industry are typically located behind and pulled by tractors. The present invention includes the inventions disclosed herein as used with various types of vehicles including seeders.

What is claimed is:

1. A wheel assembly mountable to a vehicle comprising:
a first wheel disc, and a second wheel disc, wherein the first and second wheel discs define mutually facing rim projections and rim recesses extending axially around said first and second wheel discs;
first fasteners securing said first wheel disc to said second wheel disc forming a wheel rim;
a tire with a main body attached to said wheel rim and clinched between the first and second wheel discs, said main body of said tire having tire flanges integral therewith, said tire flanges extending radially inward, said tire flanges extending into said rim recesses in between said rim projections; and,
second fasteners attaching said tire to said wheel rim, wherein said second fasteners extend through said first wheel disc, said tire flanges, and said second wheel disc to secure said first and second wheel discs, and said tire together.

2. The wheel assembly of claim 1, wherein the first wheel disc has
a first circular rim with a first outer portion and a first hub defining a first central opening, and a second outer portion and a second hub and a second central opening, and wherein the second wheel disc has a second circular rim with a second outer portion and a second hub defining a second central opening.

3. The wheel assembly of claim 2, wherein said first central opening is aligned with said second central opening with a central rotational axis.

4. The wheel assembly of claim 3, wherein said first outer portion and said second outer portion respectively of said first wheel disc and said second wheel disc face each other, and wherein said first fasteners extend from said first hub to said second hub securing said first wheel disc to said second wheel disc to form said wheel rim.

5. The wheel assembly of claim 4 wherein:
said first outer portion is continuous and surrounds and is connected to said first hub, said second outer portion is continuous and surrounds and is connected to said second hub, said first outer portion has pegs extending therefrom and into said second outer portion limiting relative motion therebetween with said recesses located in said first outer portion and said second outer portion.

6. The wheel assembly of claim 5 wherein:
said first wheel disc and said second wheel disc include spokes joining said first hub and said second hub respectively to said first outer portion and said second outer portion; and,
said flanges are positioned between said pegs.

7. The wheel assembly of claim 1 and further comprising:
a wheel bearing mounted in said wheel rim between said first and second wheel discs; and,
a ring removably holding said wheel bearing in said wheel rim, said ring removably mounted to said second wheel disc.

8. The wheel assembly of claim 7, wherein
the first wheel disc has a first circular rim with a first outer portion and a first hub defining a first central opening, and a second outer portion and a second hub and a second central opening;
the second wheel disc has a second circular rim with a second outer portion and a second hub defining a second central opening with a central rotational axis;

the wheel bearing is aligned with said first central opening and said second central opening with said central rotational axis extending therethrough, said wheel rim having a surface surrounding said bearing limiting movement of said bearing; and wherein the ring is located at said second central opening limiting movement of said wheel rim along said rotational axis.

9. The wheel assembly of claim 8 wherein said main body of said tire has an overhanging flexible portion extending outwardly of said wheel rim to limit dirt from accumulating on said tire and in said wheel rim.

10. The wheel assembly of claim 1 wherein said main body of said tire has an overhanging flexible portion extending outwardly of said wheel rim to limit dirt from accumulating on said tire and in said wheel rim.

11. The wheel assembly of claim 1:

wherein said first wheel disc includes at least one peg extending axially toward said second wheel disc; and wherein said second wheel disc defines at least one hole extending axially into said second wheel disc and configured to receive the at least one peg of said first wheel disc.

12. The wheel assembly of claim 11:

wherein said at least one peg extends axially away from a projection of said first wheel disc and into said hole of said second wheel disc; and wherein said hold of said second wheel disc is defined by a projection of said second wheel disc.

13. A wheel rim for mounting a tire to a vehicle comprising:

a first wheel disc having a first circular rim and a first hub with a first central opening;

a second wheel disc having a second circular rim and a second hub and a second central opening;

fastening means connecting said first hub to said second hub securing said first wheel disc to said second wheel disc together forming a wheel rim; and, fasteners extendable through flanges of the tire and through corresponding receiving areas of the of the first and second wheel discs to secure the tire to the wheel rim;

wherein said first wheel disc and said second wheel disc defining mutually facing projections and the receiving areas extending axially around said first and second wheel discs, said flanges extending into said recesses in between said projections.

14. The wheel rim of claim 13, wherein said first central opening is aligned with said second central opening defining a central rotational axis of the wheel rim, and wherein said flanges are integral with said main body of said tire, said flanges extending radially toward said first and second hub.

15. The wheel rim of claim 13 and further comprising pegs extending into said first wheel disc and said second wheel disc interspaced between said recesses.

16. The rim of claim 13:

wherein said first wheel disc includes at least one peg extending axially toward said second wheel disc; and wherein said second wheel disc defines at least one hole extending axially into said second wheel disc and configured to receive the at least one peg of said first wheel disc.

17. The rim of claim 16:

wherein said at least one peg extends axially away from a projection of said first wheel disc and into said hole of said second wheel disc; and wherein said hold of said second wheel disc is defined by a projection of said second wheel disc.

18. A tire for mounting to a wheel rim in turn mountable to an axle of a vehicle comprising:

a main body for surrounding a wheel rim; and a plurality of flanges projecting radially inwardly from said main body with said flanges fixedly connectable to said wheel rim limiting relative motion between said tire and the wheel rim preventing the main body from rolling off the wheel rim;

wherein said flanges are integral with said main body of said tire and projecting radially inwardly toward a center portion of said wheel rim; and wherein said flanges are configured to extend radially into separate individual recesses defined by the wheel rim, said recesses spaced between separate individual projections defined by said wheel rim.

19. The tire of claim 18, wherein said main body includes an inwardly facing surface and an outwardly facing surface with a first exterior side surface and a second exterior side surface extending between said inwardly facing surface and said outwardly facing surface and being mountable to a wheel rim.

20. The tire of claim 18 wherein said flanges include holes which extend therethrough to receive fasteners extendable therethrough and into the wheel rim limiting relative motion between said main body and the wheel rim while allowing flexibility of the tire to shake off dirt accumulating thereon.

21. The tire of claim 20 wherein the flanges extend radially inward from the inwardly facing surface of said main body.

22. The tire of claim 18 wherein the tire includes a flexible portion integral with the main body that extends outwardly of said main body and outwardly of the wheel rim when mounted thereto, said portion flexes when impacted to limit dirt accumulation on the tire.

23. The tire of claim 18 wherein said main body is clinchably securable to the wheel rim and cooperatively with said flanges securable to the wheel rim limiting relative motion between the tire and wheel rim.

24. The tire of claim 18 wherein said main body of said tire includes an overhanging portion that juts out from said first exterior side surface and is flexible to shake off dirt accumulating thereon when impacted.

25. The tire of claim 18, wherein the main body defines an interior void, and wherein the flanges extend radially away from the void.

\* \* \* \* \*